(12) United States Patent
Bogenrieder et al.

(10) Patent No.: US 7,597,170 B2
(45) Date of Patent: Oct. 6, 2009

(54) METHOD FOR CONTROLLING THE OPERATION OF A REVERSIBLE BELT RETRACTOR IN A MOTOR VEHICLE

(75) Inventors: Ralf Bogenrieder, Stuttgart (DE);
Walter Eberle, Hochdorf (DE); Rainer Justen, Altdorf (DE); Hans Roehm, Wildberg (DE); Guido Villino, Leonberg (DE); Alfred Wagner, Gomaringen (DE); Markus Woldrich, Ditzingen (DE)

(73) Assignee: Daimler AG, Stuttgart (DE)

( * ) Notice: Subject to any disclaimer, the term of this patent is extended or adjusted under 35 U.S.C. 154(b) by 323 days.

(21) Appl. No.: 10/564,395

(22) PCT Filed: Jul. 9, 2004

(86) PCT No.: PCT/EP2004/007564

§ 371 (c)(1),
(2), (4) Date: Oct. 11, 2006

(87) PCT Pub. No.: WO2005/007467

PCT Pub. Date: Jan. 27, 2005

(65) Prior Publication Data

US 2007/0158488 A1    Jul. 12, 2007

(30) Foreign Application Priority Data

Jul. 15, 2003    (DE) ................................ 103 32 024

(51) Int. Cl.
*B60R 21/00* (2006.01)
(52) U.S. Cl. ........................ 180/268; 280/803; 280/806; 280/807; 701/45

(58) Field of Classification Search ................. 180/268; 280/803, 806, 807; 701/45
See application file for complete search history.

(56) References Cited

U.S. PATENT DOCUMENTS 6,616,186 B1 * 9/2003 Midorikawa et al. ..... 280/801.1

(Continued)

FOREIGN PATENT DOCUMENTS

DE    198 11 865 A1    9/1999

(Continued)

OTHER PUBLICATIONS

International Search Report.

(Continued)

*Primary Examiner*—Toan C To
(74) *Attorney, Agent, or Firm*—Crowell & Moring LLP

(57) ABSTRACT

In a method for controlling the operation of a reversible belt retractor to release a belt extraction lock of a restraint belt in a motor vehicle, the lock can be activated by an acceleration sensor. After the belt retractor has been triggered as a consequence of a hazardous situation having been detected and after the hazardous situation has been recognized as being over, the operation of the belt retractor is controlled by a release signal at a release time in order to bring about the release of the belt extraction lock to shift it from a blocking state into a comfort-providing state. The release time is determined by a sensor model algorithm based on a model of the acceleration sensor from at least one variable characterizing the running dynamics.

18 Claims, 1 Drawing Sheet

U.S. PATENT DOCUMENTS

| | | | |
|---|---|---|---|
| 6,662,094 B2 * | 12/2003 | Murphy et al. | 701/45 |
| 6,666,292 B2 * | 12/2003 | Takagi et al. | 180/274 |
| 6,746,049 B2 * | 6/2004 | Pavlov et al. | 280/803 |
| 6,758,495 B2 | 7/2004 | Brambilla et al. | |
| 6,850,825 B2 * | 2/2005 | Murphy et al. | 701/45 |
| 7,195,089 B2 * | 3/2007 | Enomoto | 180/268 |
| 7,410,026 B2 * | 8/2008 | Nishikaji | 180/268 |
| 7,431,340 B2 * | 10/2008 | Midorikawa | 280/806 |
| 7,441,624 B2 * | 10/2008 | Tobata | 180/271 |
| 2001/0054816 A1 | 12/2001 | Brambilla et al. | |
| 2003/0114973 A1 | 6/2003 | Takagi et al. | |
| 2004/0056471 A1 | 3/2004 | Bullinger et al. | |
| 2004/0089758 A1 | 5/2004 | Bullinger et al. | |

FOREIGN PATENT DOCUMENTS

| | | |
|---|---|---|
| DE | 100 05 010 A1 | 8/2001 |
| DE | 100 10 681 A1 | 9/2001 |
| WO | WO 02/46005 A1 | 6/2002 |
| WO | WO 02/47049 A1 | 6/2002 |

OTHER PUBLICATIONS

German Office Action.
International Preliminary Examination Report.
An English Translation of the Written Opinion of the International Searching Authority including International Preliminary Examination Report Form PCT/IPEA/409 dated Jan. 2004 (pp. 1-17). (German copy previously submitted with IDS Jan. 13, 2006).
Translation of German Office Action dated Jan. 27, 2004 (pp. 18-24). (German copy previously submitted with IDS filed Jan. 13, 2006).

* cited by examiner

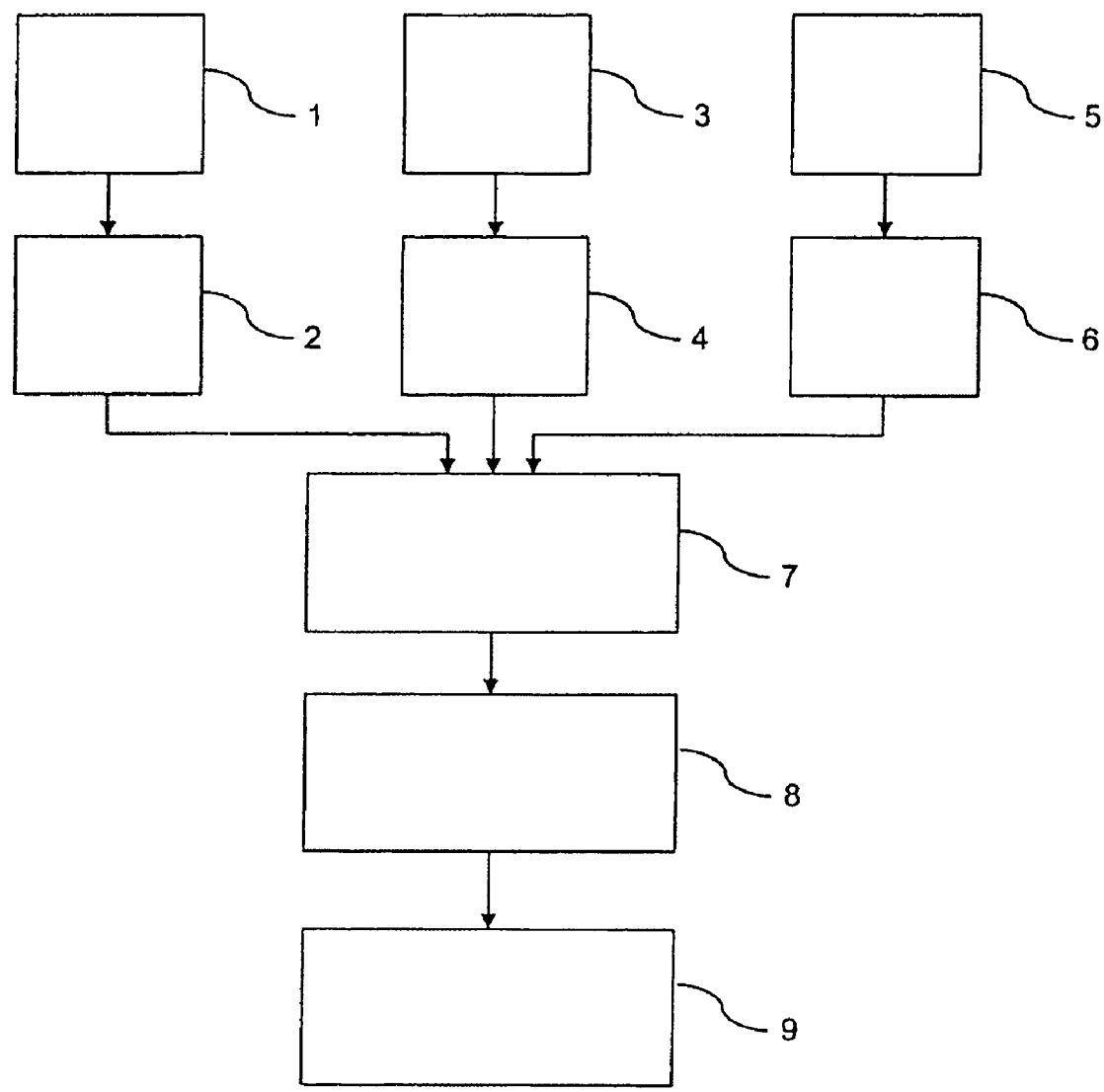
Figure

METHOD FOR CONTROLLING THE OPERATION OF A REVERSIBLE BELT RETRACTOR IN A MOTOR VEHICLE

BACKGROUND AND SUMMARY OF THE INVENTION

This invention relates to a method for controlling the operation of a reversible belt retractor to release a belt extraction lock of a restraint belt in a motor vehicle.

Conventional restraint belt systems in motor vehicles comprise a winding-up mechanism for automatically winding up the loose belt strap around a belt reel. The effect achieved by the automatic winding-up is that the belt, when put on, rests loosely and comfortably on an occupant's body and, when the seat belt is not in use, is rolled up around the belt reel (comfort-providing state). When the belt has been put on, the unwinding of the belt in the comfort-providing state is easily possible in order to provide the occupant with substantial freedom of movement. In this case, a small torque counter to the unwinding direction is produced by a retracting spring.

In particular so that a belt system of this type can restrain an occupant in the event of a collision, there is additionally a belt extraction lock. Above a specified acceleration of the belt reel in the unwinding direction and/or above a specified acceleration of the vehicle, this prevents the belt strap from being unwound. For this purpose, a belt-strap-sensitive sensor and a vehicle-sensitive sensor, which are generally part of the belt system, are provided. The response of one of these two sensors, for example of the vehicle-sensitive acceleration sensor, due to a vehicle acceleration above a threshold value prevents the belt strap from being unwound. Examples of belt-strap-sensitive sensors are a mechanical centrifugal sensor coupled to the belt reel, an electromechanical centrifugal sensor or an electronic belt extraction sensor which detects the extraction velocity of the belt strap or the acceleration thereof.

Some restraint belt systems also have a belt retractor, the operation of which can be controlled in order, in the case of an accident, to shorten the loose belt strap and/or to pull an occupant toward the back rest of the seat into a position associated with a reduced risk of injury.

Some vehicles also make use of reversible belt retractors which can be triggered repeatedly and also rapidly in succession. These reversible belt retractors can have different drives. For example, one reversible belt retractor can be driven by an electric motor which acts on the belt reel permanently or controllably via a clutch. Other reversible belt retractors are driven by compressed air from a pressure reservoir or by a tensioned spring, the pressure reservoir being re-fillable during the driving operation and the spring being re-tensionable during the driving operation. Reversible belt retractors of this type permit a tensioning of the seat belt at a specifiable strength, specifiable velocity and for a specifiable period of time. In particular, the capability of the reversible belt retractor to be repeatedly triggered makes a preventive triggering of the same possible. A preventive triggering means that the belt retractor is triggered in safety-critical driving situations which are determined, for example, by sensors associated with the running dynamics or sensors associated with the vehicle surroundings, or which are inferred by the evaluation of the brake pedal actuation, the steering angle or a driver's observation. In addition to a preventive triggering, a reversible belt retractor may also be used for the haptic warning of the driver in safety-critical situations.

In the case of a preventive triggering of the belt retractor, which can take place before a collision is detected, or in the case of a triggering of the belt retractor for warning purposes, it is desirable that, after the tensioning has taken place, after the hazardous situation has ended and during a guaranteed normal driving operation, the belt is released and again rests loosely and comfortably on the occupant. A guaranteed normal driving operation is present if the evaluation of the situation by a control device or a hazard computer does not reveal that there is a safety-critical situation or if the condition necessary for triggering the belt retractor is no longer satisfied. Such a condition may be the presence or the absence of a certain signal on a data bus or a data line.

After a tensioning of the seat belt that is carried out by means of a belt retractor and a subsequent ending of the hazardous situation, which is recognized by means of the hazard computer, the situation may arise that, because of a belt-strap-sensitive or a vehicle-sensitive sensor, which are generally coupled mechanically to the belt extraction lock, a desired extraction of the belt strap and therefore the return to the comfort-providing state is prevented.

A belt-strap-sensitive sensor may respond in particular if, after a tensioning of the belt, a release of a tensioned belt takes place while the latter is under a tensile load. If the unwinding of the belt strap takes place too rapidly, then the belt-strap-sensitive sensor responds and the operation of the belt extraction lock is generally controlled mechanically and effectively. The belt extraction lock also becomes effective if the vehicle-sensitive acceleration sensor responds because of the movement of the vehicle, for example in the case of a braking or steering maneuver, in the case of severe swaying of the vehicle or in the case of rapid cornering. If the belt extraction lock is effective, then it is no longer possible to unwind the tensioned belt strap, and the freedom of movement of an occupant is highly restricted. The seat belt is therefore to be transferred into the comfort-providing state again as rapidly as possible. This also applies if, after a reversible tensioning of the belt, the cause of the triggering of the belt retractor is no longer present and a normal driving operation is guaranteed. In order to release the belt strap again, in the case of a blocking device, for example, which is customary in motor vehicles, a pawl has to be released from a blocking toothing. This is only possible if neither the vehicle-sensitive nor the belt-strap-sensitive sensor activate the belt extraction lock.

A method for controlling the operation of a belt retractor with a blocking device is described in international publication WO 02/46005. The belt retractor here acts, inter alia, as a release device for releasing a belt extraction lock. This belt extraction lock acts on a belt reel in such a manner that, in the blocking state of the belt extraction lock, a belt strap wound up on the belt reel is prevented from unwinding, and only in the comfort-providing state is the unwinding of the belt strap possible. The belt extraction lock can only change from the blocking state into the comfort-providing state when the vehicle-sensitive acceleration sensor does not detect any acceleration above an acceleration threshold value. After the belt extraction lock comes into effect, the operation of the belt retractor is controlled by a release signal at a release time in order to bring about the change of the belt extraction lock from the blocking state into the comfort-providing state.

International publication WO 02/47049, which concerns a generic type of operation, discloses a method for controlling the operation of a reversible belt retractor to release a belt extraction lock of a restraint belt in a motor vehicle. After the hazardous situation which has been detected has been recognized as being over, the operation of the belt retractor is controlled by a release signal at a release time in order to bring about the release of the belt extraction lock to shift it from the blocking state into the comfort-providing state. A variable characterizing the running dynamics can be detected and used to determine the release time.

It is the object of the invention to improve the safety, the reliability and the comfort of a restraint belt system with a reversible belt retractor. This object is achieved by the features claimed.

If a reversible belt retractor in a motor vehicle is triggered as a consequence of a hazardous situation being detected, then a restraint belt of a belt system is tensioned. The belt system comprises a belt extraction lock which can be activated by an acceleration sensor and, in the activated state, has the effect of it not being possible for the restraint belt to be unwound from a belt reel. By means of an algorithm based on a model of the acceleration sensor, and based on at least one variable characterizing the running dynamics, a release time for the release of the belt extraction lock to shift it from a blocking state into a comfort-providing state is determined. After the end of the hazardous situation is determined, the operation of the belt retractor is controlled by a release signal at the release time determined in order to permit the belt strap to be unwound freely and, if appropriate, to bring about the release of the belt extraction lock.

An advantage of the achievement according to the invention of the object mentioned is that reliable information about the actual state of the acceleration sensor is used in a simple manner by means of the algorithm based on a model of the acceleration signal to determine the release time. By means of this reliable information about the actual state of the acceleration sensor, the release time can be defined in such a manner that, with specifiable, high probability, the acceleration sensor does not cause the belt extraction lock to be brought into effect, i.e. that, with specifiably high probability, following the control of the operation of the reversible belt retractor at the release time, the belt strap is released for unwinding.

In an alternative embodiment of a reversible belt system, in addition to the first belt extraction lock already mentioned the belt system comprises a second belt extraction lock with a smaller retaining force. This second belt extraction lock serves to prevent a simple unwinding of the reversibly tensioned belt strap, for example upon an habituary movement of an occupant. However, this second belt extraction lock is not suitable, in the case of an accident, for absorbing the forces acting on the belt strap and for restraining the belt. The second belt extraction lock may be designed, for example, as a self-locking mechanism in the form of a worm mechanism. After a reversible tensioning of the belt, this second belt extraction lock prevents the first, harder belt extraction lock with a high retaining force from becoming effective if additional, serious influences, such as, for example, a collision of the vehicle, are absent. In the case of a belt system of this type, the second belt extraction lock is likewise released by the operation of the belt retractor being controlled at the release time determined. The operation of a belt retractor of this type is controlled in the manner matched to the belt extraction lock, for example, in the case of a belt extraction lock with a worm mechanism, in such a manner that the self-locking mechanism is rotated in the unwinding direction. However, the determination according to the invention of the release time is the same as in the case of a belt retractor without a second belt extraction lock of this type.

The release pulse generally serves to control the operation of a belt system to release a reversibly tensioned belt. In the case of other belt systems which are not illustrated, this may take place in different ways than the ways illustrated, but this is insignificant regarding the fundamental advantages of the determination according to the invention of the release time.

In a refinement of the method for controlling the operation of a reversible belt retractor, the release time is determined as being just a time at which the sensor model reveals that the acceleration detected by the acceleration sensor is smaller than a specifiable acceleration threshold value. This particularly reliably prevents the belt extraction lock being effective due to an acceleration detected by the acceleration sensor at the release time.

In a further advantageous refinement, the release time is determined as being a time at which the sensor model reveals that the acceleration detected by the acceleration sensor drops below or has already dropped below a specifiable acceleration threshold value for at least a specifiable period of time. By this means, the release of the belt strap after the operation of the belt retractor is controlled at the release time can be achieved with even greater reliability. The specifiable period of time is preferably a function of the change in acceleration and preferably also dependent on the vehicle model, the load, the tires or other variables describing the driving situation.

The acceleration sensor is preferably a mechanical sensor and the sensor model is a mathematical model of the mechanical sensor. As an alternative to this, the sensor may also be an electromechanical sensor, an electronic sensor or a sensor algorithm.

In order to determine the release time, in a refinement of the invention use is made of the transverse acceleration, the longitudinal acceleration, the wheel speeds, the yaw velocity or the yaw acceleration. In particular, use is made of two or more of these variables in order to determine the release time. By means of these variables, an overall acceleration of the vehicle can be determined. If the acceleration sensor of the belt system is a ball sensor acting isotropically in the plane of the vehicle, i.e. does not have a direction of preference in the plane of the vehicle, in particular the acceleration of the vehicle is determined in the plane. The acceleration perpendicular to the plane of the vehicle may also enter into the determination of the release time.

In a simple refinement of the method for controlling the operation of a reversible belt retractor, the release time is determined as being a time at which a plurality of the variables transverse acceleration, yaw velocity, yaw acceleration, wheel speeds and longitudinal acceleration drop below a threshold value, which can be specified for the particular variable, for a specifiable period of time.

BRIEF DESCRIPTION OF THE DRAWING

The single FIGURE shows a flow diagram of an advantageous embodiment of a method for controlling the operation of a reversible belt retractor to release a belt extraction lock, which can be activated by an acceleration sensor, of a restraint belt. The operation is controlled at a release time which is determined using wheel speeds, transverse acceleration and yaw acceleration. As an alternative or in addition, use may also be made of other variables for determining the release time.

DETAILED DESCRIPTION OF THE INVENTION

In step 1, a wheel speed, or preferably a plurality of wheel speeds, is/are detected and, from the detected wheel speeds, the longitudinal acceleration of the vehicle is determined. As an alternative, the longitudinal acceleration may also be determined in another manner or may be directly detected by means of a sensor. The longitudinal acceleration determined is made available for further processing in step 2. It is inquired in step 2 whether the longitudinal acceleration is below a specifiable acceleration threshold value.

In step 3, the rotational acceleration of the vehicle about its own vertical axis is detected by sensor or is determined by means of auxiliary variables, and is made available for further processing in step 4. In step 4, it may additionally be inquired whether the yaw velocity, the yaw acceleration or an auxiliary variable taking these two variables into consideration is below a specifiable threshold value.

In step 5, the transverse acceleration of the vehicle is detected or is determined by means of auxiliary variables, and is made available for further processing in step 6. In step 6, it is interrogated whether the transverse acceleration is below a specifiable threshold value.

The results of the inquiries in steps 2, 4 and 6 are collated in step 7. A time is determined at which the monitored variables of longitudinal acceleration, transverse acceleration and yaw acceleration are below the respectively specifiable threshold values. This determined time is defined as the release time.

In a special and particularly advantageous embodiment, in step 7 the behavior of a ball within a ball sensor is simulated from the monitored variables. For this purpose, a model of the ball sensor is depicted in an algorithm and the monitored variables are used as input variables for the model.

Based on the variables determined or detected in steps 1, 3 and 5, both the current time and also a time in the future can be determined as a release time.

In step 8, further criteria which have to be satisfied for controlling the operation of the belt retractor to release a belt extraction lock are interrogated. For example, it is specified that a hazardous situation is no longer present, i.e. that the hazardous situation which is the cause for the original triggering of the belt retractor is over. Furthermore, it is checked whether there is any other critical situation, and only if no such situation is present is, in step 9, the operation of the reversible belt retractor controlled at the release time determined or within a specifiable period of time after the release time determined in order to release the belt extraction lock and therefore to transfer the belt system from the blocking state into the comfort-providing state. In an alternative refinement, the inquiries carried out in step 8 may also take place at a different time, for example even before step 1.

The invention claimed is:

1. A method for controlling the operation of a reversible belt retractor to release a belt extraction lock, which can be activated by an acceleration sensor, so that, after the belt retractor has been triggered as a consequence of a hazardous situation having been detected and after the hazardous situation has been recognized as being over, the operation of the belt retractor is controlled by a release signal at a release time in order to bring about the release of the belt extraction lock to shift it from a blocking state into a comfort-providing state, comprising:
   determining a release time in which the belt extraction lock is not effective with a sensor model algorithm based on a model of the acceleration sensor and with at least one variable characterizing running dynamics, and
   controlling the operation of the belt retractor by the release signal at the release time.

2. The method as claimed in claim 1, wherein the release time is determined as being a time at which the sensor model algorithm reveals that the acceleration detected by the acceleration sensor is smaller than a specifiable acceleration threshold value.

3. The method as claimed in claim 2, wherein the release time is determined as being a time at which the sensor model reveals that the acceleration detected by the acceleration sensor has dropped below a specifiable acceleration threshold value for at least a specifiable period of time.

4. The method as claimed in claim 3, wherein the acceleration sensor is a mechanical sensor and the sensor model is a mathematical model of the mechanical sensor.

5. The method as claimed in claim 4, wherein the release time is determined by at least one of transverse acceleration, wheel speeds and yaw acceleration of the vehicle.

6. The method as claimed in claim 5, wherein the release time is determined by the transverse acceleration and the wheel speeds and the yaw acceleration of the vehicle.

7. The method as claimed in claim 3, wherein the release time is determined by at least one of transverse acceleration, wheel speeds and yaw acceleration of the vehicle.

8. The method as claimed in claim 7, wherein the release time is determined by the transverse acceleration and the wheel speeds and the yaw acceleration of the vehicle.

9. The method as claimed in claim 2, wherein the acceleration sensor is a mechanical sensor and the sensor model is a mathematical model of the mechanical sensor.

10. The method as claimed in claim 9, wherein the release time is determined by at least one of transverse acceleration, wheel speeds and yaw acceleration of the vehicle.

11. The method as claimed in claim 10, wherein the release time is determined by the transverse acceleration and the wheel speeds and the yaw acceleration of the vehicle.

12. The method as claimed in claim 2, wherein the release time is determined by at least one of transverse acceleration, wheel speeds and yaw acceleration of the vehicle.

13. The method as claimed in claim 12, wherein the release time is determined by the transverse acceleration and the wheel speeds and the yaw acceleration of the vehicle.

14. The method as claimed in claim 1, wherein the acceleration sensor is a mechanical sensor and the sensor model is a mathematical model of the mechanical sensor.

15. The method as claimed in claim 14, wherein the release time is determined by at least one of transverse acceleration, wheel speeds and yaw acceleration of the vehicle.

16. The method as claimed in claim 15, wherein the release time is determined by the transverse acceleration and the wheel speeds and the yaw acceleration of the vehicle.

17. The method as claimed in claim 1, wherein the release time is determined by at least one of transverse acceleration, wheel speeds and yaw acceleration of the vehicle.

18. The method as claimed in claim 17, wherein the release time is determined by the transverse acceleration and the wheel speeds and the yaw acceleration of the vehicle.

* * * * *